Oct. 18, 1966    M. L. BAKER    3,279,438
WASTE HEAT RECOVERY SYSTEM FOR HEAT ENGINES
Filed March 1, 1965    2 Sheets-Sheet 1
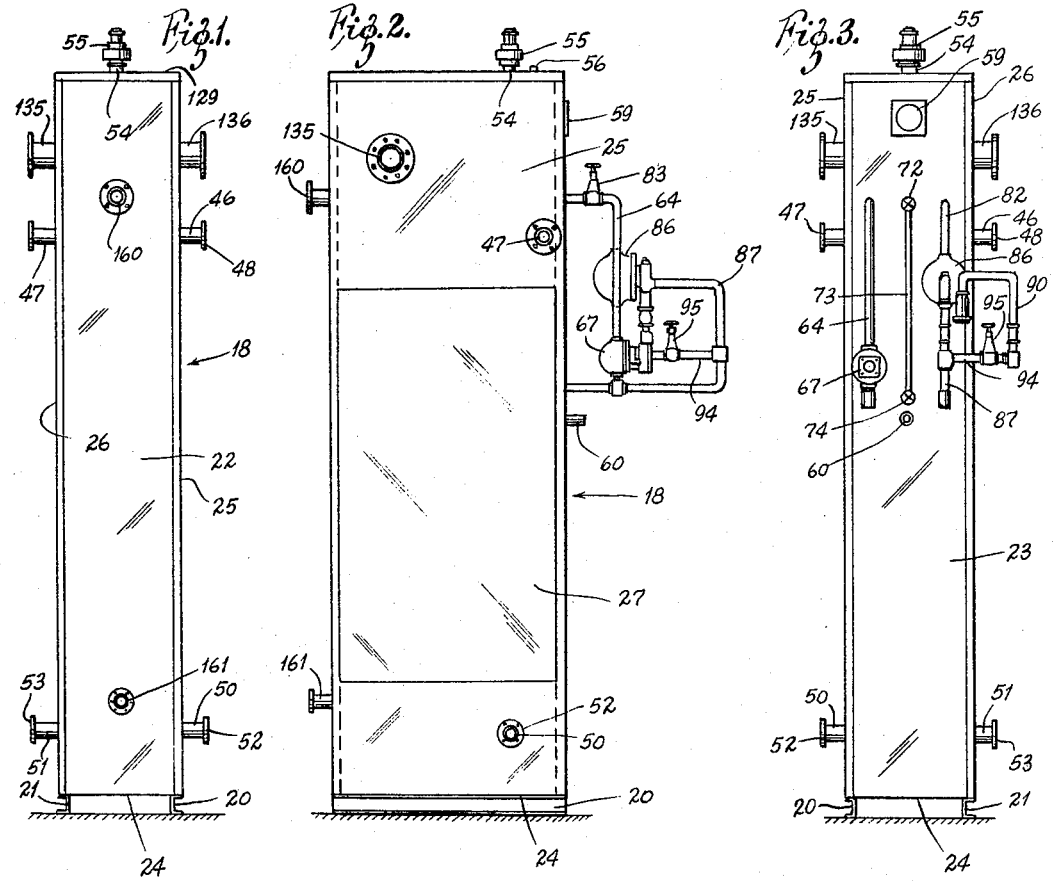
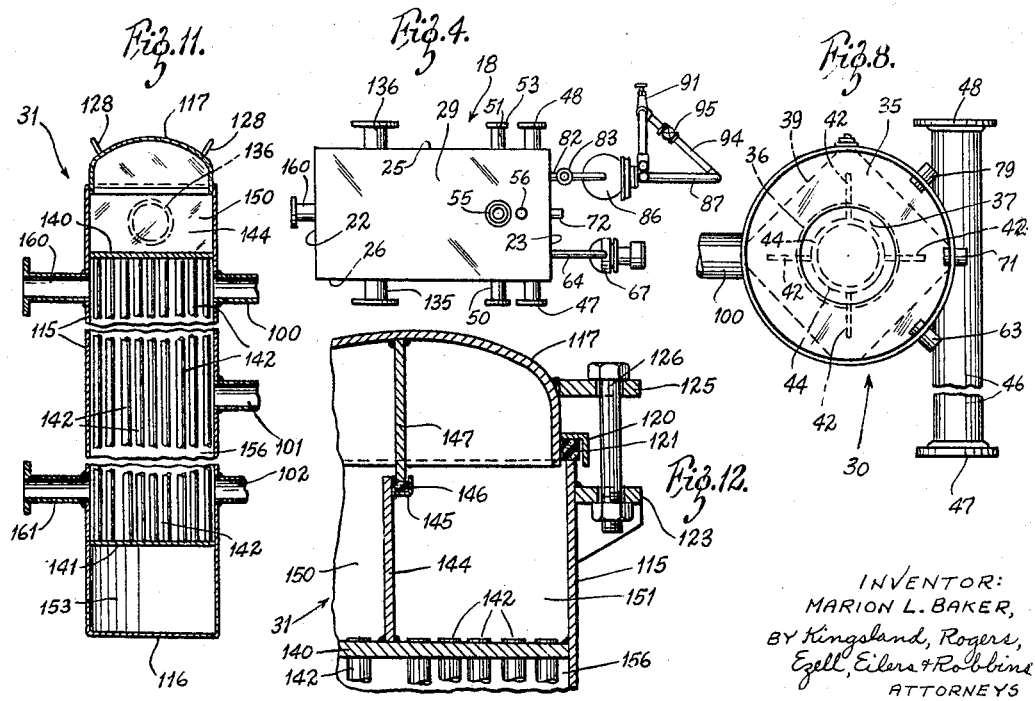
INVENTOR:
MARION L. BAKER,
BY Kingsland, Rogers,
Ezell, Eilers & Robbins
ATTORNEYS

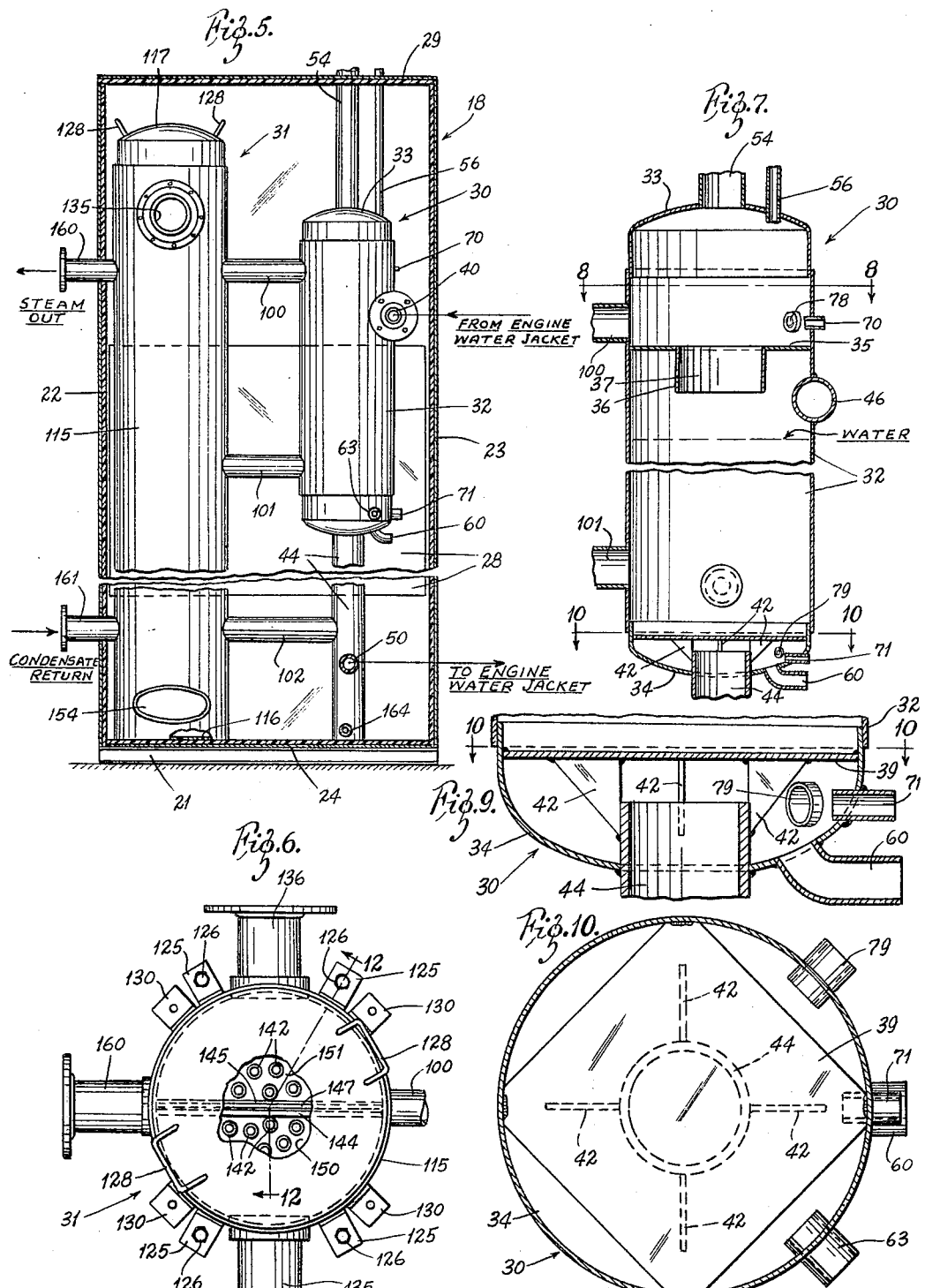

── # United States Patent Office 3,279,438
Patented Oct. 18, 1966

3,279,438
WASTE HEAT RECOVERY SYSTEM FOR
HEAT ENGINES
Marion L. Baker, Glendale, Mo., assignor to Engineering Controls, Inc., St. Louis, Mo., a corporation of California
Filed Mar. 1, 1965, Ser. No. 436,148
15 Claims. (Cl. 122—7)

The present invention relates to a waste heat recovery system for use with heat engines, especially internal combustion engines. It is particularly designed to recover heat from the cooling medium and to recover otherwise wasted heat from exhaust gases. It is arranged to use the recovered heat as latent heat of vaporization for operating some apparatus or machine such as a turbine.

Physically it comprises a single apparatus in an insulated housing. The housing contains a combination of a steam separator and an exhaust boiler. The separator is connected to receive water (or other vaporizable coolant) of the cooling system of an internal combustion engine, and to separate its liquid and vapor phases, employing preferably the system of swirling liquid to enhance steam separation and to improve pressure conditions in the liquid return to the engine. The exhaust boiler is a heat exchanger with a gas passage connected to the exhaust system of the engine and a liquid (or liquid-vapor) passage connected to the separator so as to receive both water and vapor therefrom. The two passages are in heat-exchange relationship. The separator and the boiler are so interconnected as to act as a combination apparatus in which there is a common vapor space and a common liquid space, but with the latter divided so that there can be a free swirling action of the liquid, undeterred by the necessary structure of the heat-exchanger.

It is an object of the invention to provide a system of this kind that can operate by gravity circulation, without having to provide forced circulation of the water phase between the exhaust boiler and the steam separator.

It is an object of this invention to provide an assembly of this type wherein a relatively small steam separator can be used for a wide range of system capacities. Specifically, it is an object to provide a system of this kind in which the exhaust boiler is so associated with the steam separator that the exhaust boiler itself can act as part of the steam separator, performing part of the total steam separating functions, thereby reducing the size or capacity of the separator itself. A further object of the invention is to provide a system of this kind with a common water level for both the steam separator and the exhaust boiler, so that the coolant commonly occupies both the separator and the boiler or heat-exchanger, with a liquid-vapor interface in each at which vapor may separate from the liquid phase and enter a connected or a common vapor space. It is a further object to provide such a system wherein there is a liquid-containing means having parts wherein the liquid may be swirled and other parts wherein the liquid may be in heat-exchange contact with a container of another fluid, these parts being so combined as to have a generally common liquid level and a common vapor space, but yet having the swirling and heat-exchanging functions occurring in the liquid without mutual interference.

Another object is to provide a system of this kind in which there is a single ambient temperature condition around both units; and specifically to do so by providing a single insulated container or enclosure for the steam separator and the exhaust boiler.

Other objects include providing a compact unit that requires a minimum of space for given capacity and yet which has provisions for servicing in a convenient manner, that has an automatic liquid level control to maintain the water level at the proper point in the system automatically, or alternatively to provide for the supplying of additional water to the system wholly manually.

Further objects include provision of a low water alarm system. Other objects will appear from the description to follow.

In the drawings:

FIGURE 1 is a side elevation of the apparatus taken from the left side of FIGURE 2;

FIGURE 2 is a front elevation;

FIGURE 3 is a side elevation taken from the right side of FIGURE 2;

FIGURE 4 is a top view of the apparatus looking down on FIGURE 2;

FIGURE 5 is a vertical side-to-side section through the middle of the housing, broken away to reduce the height of the view, showing the exhaust boiler and the steam separator in elevation;

FIGURE 6 is a top view of the exhaust boiler;

FIGURE 7 is a vertical diametrical section of the steam separator partly broken away;

FIGURE 8 is a horizontal or transverse section through the upper part of the steam separator taken on the line 8—8 of FIGURE 7;

FIGURE 9 is an enlarged vertical diametrical section through the bottom of the steam separator;

FIGURE 10 is a horizontal section through the lower part of the steam separator taken on the line 10—10 of FIGURE 9, and it is also an enlarged section on the line 10—10 of FIGURE 7;

FIGURE 11 is a vertical diametrical section through the exhaust boiler, the same being partly broken away; and FIGURE 12 is an enlarged fragmentary section on the line 12—12 of FIGURE 6, showing the means of bolting the cap on the exhaust boiler.

In FIGURES 1 to 5 the housing 18 of the apparatus is illustrated. The parts to be described can be assumed to be made of appropriate kinds of steel, or other suitable material obviously useful for the purposes indicated. The housing 18 is here shown as including base rails 20 and 21 by means of which it may be securely mounted on an appropriate support or floor. The housing has two end panels 22 and 23 that are mounted upon a bottom panel 24 that is secured to the two rails 20 and 21. Appropriate means, not shown, may be used to give adequate rigidity to these parts. There are a front panel 25 and a rear panel 26 that are joined to the two end panels and to the bottom panels. The two panels 25 and 26 have removable access panels 27 and 28 that make the interior of the housing accessible from the front or rear. There is a removable top panel 29. The several panels may be bolted or otherwise secured together in known manner. This housing preferably has insulation lining all of its walls and panels to prevent or minimize the loss of heat through its walls.

Within the housing are two interconnected units, namely, a steam separator generally designated 30 and an exhaust heat exchanger or boiler generally designated at 31.

The steam separator 30 includes an outer shell 32 having top and bottom heads 33 and 34. Near the top of the shell 32 there is a partition 35 having at its middle a downwardly extending cylindrical flange or collar 36 surrounding an opening 37. This opening 37 may conveniently have a diameter about half that of the shell. The partition 35 separates the space above and below it, except for the opening 37. At the bottom of the shell 32 near the upper edge of the bottom header 34, there is another partition 39. It conveniently may be square, having its corners welded or otherwise secured to the inside surface of the header 34, providing flow spaces for water around its straight sides. This partition may be stabilized by four braces 42 that are welded to the bottom surface of the partition 39 and also to a downcomer or stand pipe 44 that passes through the header 34 and is welded thereto as indicated. The downcomer 34 may rest upon the floor 24 of the housing.

The separator 30 is designed to be connected to a source of otherwise waste heat such as the water jacket of an internal combustion engine. There is a tangential hot water inlet pipe 46 (FIGURES 7, 8) disposed below the partition 35, but laterally spaced from the bottom of the collar 36, and which is to be connected to the hot water outlet from the engine. The inlet 46 has coupling flanges 47 and 48 on its opposite ends. The pipe 46 extends through the front and back walls 25 and 26 of the housing so as to make either of the coupling flanges 47 and 48 accessible for connection to the engine. The unused coupling is closed by an appropriate cap.

The water return to the engine takes place through one of two outlets 50 and 51 in the lower part of the downcomer 44. These outlets 50 and 51 may extend respectively through the front and back walls 25 and 26 of the housing, and may have coupling flanges 52 and 53, respectively, by means of which either one may be connected to a return water pipe to the internal combustion engine. The unused coupling may be capped.

The steam separator tank 30 has a connector 54 passing through the upper header 33 and the top wall 28 of the housing and having an automatic pressure-relief safety valve 55 secured to it. Also, an air vent pipe 56 opens from the top of the tank. It is thermostatically controlled to close when subjected to the pressure of high temperature steam and to open when at lower temperatures as when air is present. This permits air to be driven out when the apparatus operates if temperature in the separator becomes excessive. A blowdown outlet 60 is located in the bottom of the chamber 32. It is normally valved and connected to the sewer or other exhaust.

The steam separator has connections to a low water alarm. This includes an upper coupling 62 in the steam zone and a lower coupling 63 in the water zone below the partition 39. A pipe 64 leading from the connectors 62 through the wall of the housing 23, connects to the upper end of a low water alarm switch device 67, and a pipe 65 connects the lower coupling 63 into the lower end of this alarm 67. A plug may be provided below the low water alarm 67 for clean-out purposes. This alarm may be one of the well-known kinds that respond to reduction in water level in the loop 62–64–65–63 by an audible or visible signal and by operating a switch to control continued operation of the internal combustion engine. A float switch is preferred. This apparatus operates when the water level lowers to about the center line across the unit 67.

There are connections on the steam separator for a gauge loop. They include an upper coupling 70 and a lower coupling 71. The coupling 70 is connected by a pipe 72 passing through the end wall 23 of the housing, connecting to the upper end of a gauge glass 73. The bottom of the gauge glass 73 is connected by a pipe 74 to the coupling 71. This gauge glass is designed to indicate the water level within the separator and within the exhaust boiler. The usual upper and lower valves (not shown) may be provided to cut off the water if the glass breaks.

There are upper and lower couplings 78 and 79 for connection of the steam separator to a make-up water liquid level control. An upper pipe 82 connects from the upper coupling 78, through the wall 23, and through a valve 83, to the upper end of a liquid level float-type control 86. A pipe 87 connects from the control 86 back through the wall 23 into the lower coupling 79. This provides a loop that establishes a water level in the control 86 corresponding to that in the separator 30.

There is also a make-up water connection into the float control 86. It includes a condensate return pipe 90 adapted for connection to a source of make-up water, such as the condensate from the machine operated by the steam generated by the present apparatus. The pipe 90 connects into the control 86, admission of water thereinto from the pipe 90 being under control of the float (not shown) in the apparatus 86. There is a manual valve 91 in the pipe 90. Also there is a bypass connection to admit make-up water into the separator by manual action in case the float control is inoperative. This bypass pipe 94 contains a manual valve 95, and connects the condensate return pipe 90 directly to the pipe 87 and so to the separator. The float control is commercially known and need not be described in detail.

When the liquid level becomes low, the float descends and opens an internal valve to admit water by way of the pipe 90, or operates a switch to cause a pump (not shown) to operate and deliver water through the pipe 90 to the separator until the float rises again and either closes the valve, or de-energizes the pump. The normal water level is a few inches below the inlet pipe 46, and is about the middle of the enlarged chamber of the control 86.

The steam separator has three lateral connections that are joined to the exhaust boiler 31 at three different heights. These lateral connections include a steam pipe connection 100 above the partition 35 and above the water line. There are two water connections, one an intermediate pipe 101, and the other a lower pipe 102, the last pipe 102 leading from the downcomer 44.

The exhaust boiler 31 consists of a two-pass heat exchanger of the gas-tube type wherein the exhaust gases of the engine pass through the tubes. It acts also as a silencer as well as an exhaust heat recovery unit. It comprises a cylindrical shell 115, with a bottom 116, an upper header 117. The upper header 117 may be removably held in place by means illustrated in FIGURE 12. As shown there, there is an L-sectioned ring 120 secured around the header 117 and adapted to compress a woven asbestos gasket 121 into sealing relationship against the top edge of the shell 115. To secure these parts together, there are a plurality of upper and lower bolting lugs secured about the shell 115 and the header 117, one of which is illustrated in FIGURE 12. FIGURE 12 illustrates a lower bolting lug 123 that is welded to the outside of the cylindrical shell 115 and a corresponding lug 125 welded to the outside of the header 117. These two lugs have horizontal portions with bolt holes in them to receive a bolt 126 as will be understood. Preferably there are six such bolts arranged around the header. There are also two handles 128. Brackets 130 may be provided if desired for attaching the whole boiler to the floor 24 of the housing.

The boiler 31 is divided into two heat exchange passes. At is upper end just below the header 117, the shell 115 has oppositely disposed exhaust couplings 135 and 136. They may have flanges on their ends for being bolted to the exhaust pipes from the engine and thence to atmosphere. The shell 115 has upper and lower tube sheets 140 and 141, respectively. A plurality of tubes 142 are mounted in and open through the two tube sheets. Above the tube sheet 140 there is mounted a plate 144 forming part of a partition. The plate 144 extends across the tube sheet 140 and is welded thereto in an upright position. It has an L-section member 145 welded across its upper edge to provide a channel to receive a gasket 146. The channel also receives another plate 147 that is welded into the header 117 and has its lower edge drawn down in sealing relationship onto the gasket 146 when the header 117 is bolted into place. The foregoing partition, made up primarily of the two plates 144 and 147, divides the space above the upper tube sheet 140 into two chambers 150 and 151. Thus, the exhaust gases enter via the pipe 135, into the chamber 150, and may then flow down through those of the tubes 142 that are on the same side of the partition plate 144, thence through the bottom tube sheet 141 into a bottom chamber 153 between the bottom sheet 141 and the bottom 116 of the shell 115. Then they may pass upwardly through the other tubes to flow into the chamber 151 and thence out through the pipe 136. They may equally well pass in the opposite direction. The chamber 153 has a clean-out opening 154 with an appropriate removable cover.

The shell portion of this exchanger or boiler 31 is the water chamber 156 above the lower tube sheet 141, below the upper tube sheet 140 and on the outside of the tubes 142. Previously-mentioned connectors 100, 101 and 102, leading from the steam separator 30 and its downcomer 44, are connected into the water and steam chamber 156. The connector 100 is introduced into the steam chamber above the water line, whereas the two connectors 101 and 102 are below the water line. Thus, the water levels within the separator 30 and the heat-exchanger 31 automatically correspond.

The function of the heat exchanger is to evaporate some of the water and thereby to provide steam capable of other uses such as for operation of a turbine or the like. To this end there is a steam outlet 160 from the steam or vapor space that is adapted to be connected to the apparatus or system employing steam. Additionally, there is a condensate return connection 161 that is adapted to conduct the condensed steam or water back to the heat exchanger.

Appropriate drain plugs and inspection openings can be provided for the boiler 31 and especially for the water pass 156.

*Operation*

This apparatus is designed for use especially with a water-cooled internal combustion engine, and such will be the basis for this description of the operation.

The inlet 46 to the separator 30 is adapted to be connected with the cooling system of the engine so that the engine coolant is introduced tangentially into the cylindrical chamber 32 of the separator 30. The outlet 50 (or 51) is connected back to the water inlet of the engine.

The boiler or heat-exchanger 31 has its inlet 135 to its gas passage connected to the exhaust system so that the exhaust gases which contain useful heat can flow therethrough, as will be explained. The liquid passage 156 of the exchanger 31 has its vapor outlet 160 connected to the vapor-operated apparatus (such as a turbine) and its return condensate connection 161.

It is desirable to have the engine resting on a base at an elevation not greatly different from that of the illustrated apparatus, although this is not necessary as long as the low water level alarm switch can be located above the engine jacket water outlet.

The make-up pipe 90 can also be connected to an appropriate supply of new water or to the condensate line from the turbine or other vapor-operated device. Appropriate work apparatus is illustrated in the prior application, Ser. No. 248,597, filed December 31, 1962 in the name of Marion L. Baker, now Patent No. 3,228,189.

With the engine operating and its water pump circulating, a mixture of water and water vapor from the cooling system of the engine enters through the inlet 46 of the separator 30, and flows into the circular separator generally tangentially. It causes the mass of liquid in the separator to swirl in the manner indicated by Patent 2,681,643, in the name of R. R. Hull, issued June 22, 1954. As stated in that patent, under the effects of the tangentially introduced influent entering by the inlet 46, and the consequent centrifugal action, the water within the separator 30 is swirled and the mass of liquid assumes a general form of a paraboloid of revolution. Depending upon the amount of heat being developed in the engine and rejected to its water jacket, and the resulting velocity of the swirling liquid within the separator 30, the upper surface of such liquid assumes various paraboloidal positions which result in various maximum heights of the liquid adjacent the wall of the separator, with the inverted vortex at the axis of the separator. The partition 39 acts as a shield between this swirling vortex of water above it and a quiescent mass of water below it. Swirling of the water below the partition 39 is restrained by the baffles 42. The head pressure acting upon this quiescent body of water is a function of the height of the paraboloid of swirling water adjacent the inner surface of the shell of the separator 30. This arrangement of the swirling water improves the separation of vapor from the liquid, and also increases the head of liquid causing return flow out the outlet 50.

Water above the partition 39 can readily descend to below it around the side edges of the square partition as can be understood from FIGURE 10. Also any sedimentation in the separator descends around the upstanding downcomer 44 above the bottom end 34 of the main shell 32 and can be blown out through the blow-out opening 71 in the bottom of the shell, as necessary.

The downcomer 44 can be relatively small in diameter as illustrated, since it is necessary to have only that enlarged area represented by the chamber in the shell 32 in which the swirling action takes place. In other words, the shell 32 has enough vertical dimension to accommodate that range of paraboloidal masses of swirling water required by the varying velocities, and, hence, the cooling propensities required by the particular engine or other unit being cooled. This requires a relatively narrow range of heights of chambers 32, and consequently a wide range of sizes and capacities for complete separators 30 can be had by substituting different heights of downcomers on a small number of shells 32.

While the depending collar of the flange 36 on the upper partition 35 of the separator 30 prevents the upper reaches of the paraboloidal swirling water from getting above the partition, nevertheless, the opening 37 permits all vapors to flow into the upper space in the top of the separator. As noted in the Hull patent above, the purpose of the swirling action is to increase the generation of vapor from the given mass of water.

As noted, the water level in both the separator 30 and the heat exchanger-silencer 31 will be the same, because of the communication by way of the crossed pipes 101 and 102. The static water level is indicated in the drawings, but the level within the water section 156 of the heat exchanger 31 will be a function of the paraboloidal swirling condition in the separator 30. The connecting pipe 101 is located below the static water level which is the minimum level adjacent the inner surface of the shell 32.

By the connections indicated between the separator 30 and the heat-exchanger 31, the combination of the two of them acts as one in several respects. The liquid level is equivalent, and connected, but in such a way that the heat-exchange passage pipes 142 do not obstruct the swirling action. The vapor space above the liquid is connected to be a common vapor area. The vapor from the separator 30 and the boiler 31, accumulated with steam generated in the boiler 31 by the heat applied therein, passes out through the pipe 160, to be used as desired to heat, to generate mechanical power, or otherwise.

Since the return pipe 50 connected to the inlet side of the water pump leads from the lower end of the downcomer 44, it tends to draw water from the water section 156 of the heat-exchanger 31 as well as from the lower part of the separator. This could cause the liquid level in the heat-exchanger 31 to be lowered below that caused by the swirl in the separator 30 were it not for the two cross-connecting pipes 101 and 102. If the pipe 101 were not provided, liquid would have to flow both ways through the one pipe 102 which would be less effective and would tend to cause a short circuit wherein the circulation of water would be principally that in the separator 30.

The exhaust gases flow from the engine through the inlet 135 to the space constituting a half of the free space at the top of the heat-exchanger shell, indicated at 150, thence down through half of the pipes 142, to below the tube sheet 141, thence back up through the other half of the tubes to the space 151, and out the exhaust 136. In this action heat from the exhaust is given to the water within the water space 156 wherein, as noted, the water level is a function of the swirling action in the separator 30. This exhaust heat causes vaporization of more of the water which, as noted, can flow out the top of the section 156 of the boiler 31 by way of the pipe 160.

As heretofore noted, the juxtaposition of the separator 30 and the boiler 31 at corresponding levels and their interconnection in the manner indicated, permits the liquid level in both to correspond, without pumps. As noted, the liquid level in the shell 32 of the vaporizer is limited by the partition 35, which limit is below the outlet 100. This limit is correspondingly below the outlet pipe 160 from the liquid passage 156 of the boiler 31. Consequently raw liquid is not sent out to the work device by way of the outlet pipe 160.

The presence of the two units in close association within an insulating enclosure means that the heat conditions surrounding the operating parts of the apparatus are more uniform. It is desirable to reduce the loss of heat directly into the atmosphere and to absorb a maximum part of such heat as latent heat of vaporization in the steam being generated. This condition is enhanced by the enclosure of both units in the insulating housing.

The system illustrated normally operates at approximately one atmosphere gauge. When the makeup water is supplied through the unit 90, it is mixed with the hot portion of the water and this eliminates any tendency of incoming cold water to sub-cool the coolant water for the engine. The normal operation of the control 86 is to maintain a predetermined level of water in the units 30 and 31. If the water level drops below that determined by the control 86, it will open an automatic valve and cause the introduction of additional water, either condensate from the turbine or raw water through the pipe 90 past the valve 91, which is open at this time. However, should the water level go down because of failure of the control 86, the valve 91 can be closed and the valve 95 opened, whereupon additional water passes through the by-pass 94 into the system.

The minimum water level is determined by the control 67. If the level decreases below that determined by this control, the float in the control acts to sound an alarm and ordinarily to disable the engine and stop the circulation as well as the generation of heat by the engine. At all times the liquid level in the system can be observed in the gauge glass 73, and the pressure on the pressure gauge 59.

Should be pressure increase beyond a predetermined limit, the pressure relief unit 55 opens to relieve the pressure.

The sediment accumulating in the lower head 34 of the shell 32 of the vaporizer 30 can be expelled through the blowdown passage 71 which is normally plugged. There is a similar blowdown passage 164 at the bottom of the downcomber 44. Normally the solids descend in the separator 30, because of the swirling action, leaving the boiler 31 relatively free of such.

For cleaning the tubes of the heat-exchanger 31, the head 117 can be removed by removing the bolts 126 and lifting the head off. Appropriate sedimentation blowdowns can be provided for the water space 156.

Various changes and modifications may be made within the process of this invention as will be readily apparent to those skilled in the art. Such changes and modifications are within the scope and teaching of this invention as defined by the claims appended thereto.

What is claimed is:

1. In a system of the kind described for connection with an apparatus having a circulating vaporizable cooling liquid, and with a device to be operated by vapor: a combination of a vapor separator and a heat-exchanger; the vapor separator including a chamber to receive the cooling liquid wherein the vapor therefrom may separate from the liquid and rise to a vapor space in the upper part of the chamber with the liquid in a liquid space in the lower part thereof; an inlet into the chamber for connection to the apparatus, and for delivery of the coolant from the apparatus into the chamber; an outlet from the chamber for connection back from the liquid space to the apparatus; the heat exchanger having a hot fluid passage and a liquid passage, the passages being separate from but in heat exchange relation to each other; the liquid passage being at the same level as the vaporizer chamber and communicating therewith in the liquid space and in the vapor space, whereby liquid and vapor may flow between them and establish a common static liquid level, with a common vapor space above the liquid level; a vapor outlet from the common vapor space for connection to the vapor-operated device; and connections to the vapor-operated device; and connections for introducing hot fluids through the hot fluid passage of the heat-exchanger to cause evolution of further vapor from the liquid in the liquid passage in heat-exchange relationship to the hot fluids.

2. In the system of claim 1: a common insulating means surrounding the vapor separator and heat-exchanger combination.

3. In the system of claim 1: the vapor separator chamber having a circular portion into which the inlet discharges tangentially to provide a swirling mass of liquid in the said portion; a partial partition near the lower part of the circular portion and covering the middle thereof, but open at the sides to provide a space below it for quiescent liquid, the outlet from the chamber being below the partition; and the liquid space of the vaporizer communicating with the liquid space of the heat-exchanger above and below the partition.

4. In the system of claim 3: the vapor separator having a second partition above the inlet, with a central passage through it; the vapor space of the separator communicating with the upper end of the liquid passage from a point above the second partition.

5. In the system of claim 4: the second partition having a flange depending from it surrounding the central passage through it.

6. In the system of claim 1: the vapor separator chamber and the heat-exchanger comprising two vertically disposed devices arranged in proximity to each other, the heat-exchanger being taller than the vapor separator chamber, but the latter having a downcomer in the form of a receptacle of reduced diameter opening into the lower end of the chamber in the liquid space thereof, and depending downwardly at least substantially as far as the bottom of the liquid passage of the heat-exchanger, the downcomer connecting with the heat-exchanger adjacent the bottom of the downcomer and the bottom of the said liquid passage, and the outlet for connection back to the apparatus being cooled opening from the downcomer at its lower end.

7. In the system of claim 1: the vapor separator chamber being cylindrical and having its inlet opening tangentially thereinto, whereby the incoming liquid-vapor may cause the mass of liquid in the chamber to swirl therein to have a central inverted vortex and to rise up from the vortex along the side walls, the difference in height between the vortex and the periphery of the liquid varying over a predeterminable range, the height of the chamber being at least substantially equal to this height difference; the said difference being less than the height of the liquid passage of the heat-exchanger; the vapor separator chamber having a downcomer comprising a receptacle of reduced cross section extending downwardly from the bottom of the chamber to at least substantially the bottom of said water passage of the heat-exchanger, the vapor chamber communicating with the said water passage in the vapor space below the liquid level in the chamber wherein the swirling liquid is produced and in the downcomer.

8. In the system of claim 7: the vapor separator chamber having a partial partition at the bottom thereof, over the downcomer, and means to restrain swirling of liquid below the partition.

9. In the system of claim 8: the vapor separator chamber having a second partition adjacent the top, with a control opening through it, to limit the height to which the swirling liquid may rise.

10. In the system of claim 7: the vapor chamber and the heat-exchanger having a common insulation enclosing them.

11. In the system of claim 7: the vapor chamber and the heat-exchanger having a common housing in which they are enclosed, the housing having a floor upon which the same are supported in side-by-side arrangement.

12. In the system of claim 7: the combination of vapor chamber and heat-exchanger having a liquid-level responsive control actuatable in response to fall of liquid level to a predetermined minimum.

13. In the system of claim 7: the combination of vapor chamber and heat-exchanger having a make-up liquid level means, comprising a control connected to the combination to respond to liquid level therein, and adapted to be connected to a source of make-up liquid, the control being adapted to connect the source of make-up liquid to the said combination when the liquid level in the said combination lowers below a predetermined height.

14. In the system of claim 13: there being additionally a manually controlled by-pass for introducing make-up liquid to the said combination.

15. In a combination vapor separator and heat-exchanger: liquid and vapor containing means including a first portion having a cylindrical wall with an inlet disposed to direct liquid around the wall and swirl the same; a second portion connected with the first in their lower parts so as to have corresponding liquid levels, said two portions being also connected in their upper portions to provide a common vapor space into which vapor may rise from their corresponding liquid levels and liquid-vapor interfaces; a vapor outlet for connecting the vapor away from the common vapor space, to be used; and heat-exchange passage means within the liquid-containing portion of the second portion, to conduct another fluid in heat-exchange relationship to the liquid; the heat-exchange passage means being thus disposed so as not to prevent the swirling of the liquid in the first portion.

References Cited by the Examiner

UNITED STATES PATENTS

| | | | |
|---|---|---|---|
| 2,048,308 | 7/1936 | Welter | 122—7 |
| 2,638,077 | 5/1953 | Smith et al. | 122—7 X |
| 2,681,643 | 6/1954 | Hull | 123—41.25 X |
| 3,223,150 | 12/1965 | Tramontini | 122—7 X |

FOREIGN PATENTS 666,061 7/1963 Canada.

CHARLES J. MYHRE, *Primary Examiner*.